United States Patent
Chen et al.

(10) Patent No.: US 11,763,485 B1
(45) Date of Patent: Sep. 19, 2023

(54) DEEP LEARNING BASED ROBOT TARGET RECOGNITION AND MOTION DETECTION METHOD, STORAGE MEDIUM AND APPARATUS

(71) Applicant: Anhui University of Engineering, Wuhu (CN)

(72) Inventors: Mengyuan Chen, Wuhu (CN); Pengpeng Han, Wuhu (CN); Wei Wang, Wuhu (CN); Tao Xu, Wuhu (CN); Jinhui Liu, Wuhu (CN)

(73) Assignee: ANHUI UNIVERSITY OF ENGINEERING, Wuhu (CN)

( * ) Notice: Subject to any disclaimer, the term of this patent is extended or adjusted under 35 U.S.C. 154(b) by 0 days.

(21) Appl. No.: 18/110,544

(22) Filed: Feb. 16, 2023

(30) Foreign Application Priority Data

Apr. 20, 2022 (CN) .......................... 202210415251.0

(51) Int. Cl.
*G06T 7/73* (2017.01)
*G06T 7/246* (2017.01)

(52) U.S. Cl.
CPC ............ *G06T 7/73* (2017.01); *G06T 7/246* (2017.01)

(58) Field of Classification Search
CPC ................................ G06T 7/73; G06T 7/246
See application file for complete search history.

(56) References Cited

U.S. PATENT DOCUMENTS

| | | | |
|---|---|---|---|
| 2018/0189573 A1* | 7/2018 | Divakaran | G06V 20/52 |
| 2020/0285247 A1* | 9/2020 | Tan | G06V 20/10 |
| 2021/0019897 A1 | 1/2021 | Biswas et al. | |
| 2022/0161422 A1* | 5/2022 | Chen | B25J 9/1694 |
| 2023/0092774 A1* | 3/2023 | Velardo | G06V 10/40 |

FOREIGN PATENT DOCUMENTS

| | | | |
|---|---|---|---|
| CN | 112132897 A | 12/2020 | |
| CN | 112991447 A | 6/2021 | |

OTHER PUBLICATIONS

Hu et al., "Dynamic Object Segmentation Based on Mark R-CNN Apply in RGB-D SLAM," Industrial Control Computer Issue 3, 2020, pp. 15-17, 3 pages.

* cited by examiner

*Primary Examiner* — Shefali D Goradia
(74) *Attorney, Agent, or Firm* — MUNCY, GEISSLER, OLDS & LOWE, P.C.

(57) ABSTRACT

The present invention discloses deep learning based robot target recognition and motion detection methods, storage media and devices, the method consists of the following steps: Step S1. adding masks to regions where potentially dynamic objects are located through instance segmentation networks incorporating attention mechanisms and positional coding; Step S2, estimation of the camera pose using static feature points outside the instance segmentation mask in the scene; Step S3, estimation of the object pose transformation matrix from the camera pose; Step S4, determining the state of motion of the object's characteristic points from the relationship between motion parallax and differential entropy, and thus the state of motion of the object as a whole; Step S5, rejects the dynamic objects therein and repairs the static background of the rejected area for positional estimation and map construction. The invention improves the accuracy of segmented boundaries of occluded dynamic objects, and the rejection of dynamic region feature points reduces the impact of dynamic objects on the system.

4 Claims, 6 Drawing Sheets

DEEP LEARNING BASED ROBOT TARGET RECOGNITION AND MOTION DETECTION METHOD, STORAGE MEDIUM AND APPARATUS

TECHNICAL FIELD

The invention relates to the technical field of Simultaneous Location And Mapping (SLAM), specifically relates to deep learning based robot target recognition and motion detection methods, storage media and devices.

BACKGROUND

Simultaneous Localization and Mapping (SLAM) is the process by which a mobile robot uses its own mounted cameras, LIDAR and other sensors to create a map of its local environment in an unknown environment, while estimating the robot's own location. The current mainstream vision SLAM systems have achieved high accuracy in localization and composition in large-scale environments, but the method has difficulty in marking potential dynamic objects under dynamic occlusion scenes, cannot accurately determine the potential object motion status and has a low number of feature points after eliminating dynamic objects, while the inability to accurately segment the area of potential dynamic objects also leads to the fact that even if the area of dynamic objects is eliminated, the static background corresponding to the eliminated area is difficult to be completed, so dynamic objects have a greater impact on the localization accuracy of the SLAM system, and the accuracy of system pose estimation and map construction is also affected.

SUMMARY OF THE INVENTION

The purpose of the present invention is to provide a deep learning based robot target recognition and motion detection method for solving the technical problem of the prior art that existing map construction methods cannot build a complete and fully static map due to dynamic occlusion scenes, and cannot combine reliability and robustness.

The described method of deep learning based robot target recognition and motion detection, comprising the steps of:

Step S1. Adding masks to regions where potentially dynamic objects are located through instance segmentation networks incorporating attention mechanisms and positional coding.

Step S2, Estimation of the camera pose using static feature points outside the instance segmentation mask in the scene.

step S3, Where the object pose transformation matrix is estimated from the camera pose because the camera pose and the object pose projection are coupled in the same image.

Step S4, Find the median motion parallax of all points on the potentially moving object, and obtain the differential entropy of motion uncertainty according to the positional optimization process, and determine the motion state of the object's characteristic points from the relationship between the motion parallax and the differential entropy, so as to determine the motion state of the whole object.

Step S5, The dynamic objects are eliminated and the static background of the eliminated area is repaired, and the high quality feature points are filtered according to information entropy and cross-entropy for positional estimation and map construction.

Preferably, in said step S1, the multi-attention module consists of two sub-networks, the channel attention mechanism and the spatial attention mechanism, which connect the input feature map F in the channel dimension and the spatial dimension respectively, and concatenate the corresponding acquired channel dimension feature map F' with the spatial dimension feature map F" to obtain the output F''', in order to enhance the pixel weight of the obscured object part and improve the recognition rate of the obscured object. The channel attention mechanism works by assigning weights to each layer of channels in the feature map, while the spatial attention mechanism works by increasing the weight of the pixel values at the occluded locations in the feature map, continuously adjusting each weight value after learning, and then directing the network to focus on the area where the occluded part is located, thus adding a mask to the area where the potential dynamic object is located.

Preferably, in said step S1, the H×W×C feature map F is input to the channel attention mechanism, and the feature map is subjected to average pooling and maximum pooling operations to obtain information about each channel of the feature map. The features $F_{avg}$ and $F_{max}$ obtained through average-pooling and max-pooling are subjected to the fully connected layer FC module to strengthen the correlation between channels and to reallocate the weights of each channel for better learning of occlusion features. The output $f_v$, obtained through the channel attention mechanism, is calculated as shown below:

$$f = \sigma((F_{avg} + F_{max})\eta\beta)$$

Where, $\sigma$ denotes the Sigmoid function, $\eta$ denotes the ReLU function, $\beta$ is the parameter for the fully connected layer, finally, the channel dimensional feature map F' is obtained by layer-by-layer channel weighting of the input feature map F using $f_v$, with H, W and C denoting height, width and number of channels respectively;

In step S1, the input feature map F is also fed into the spatial attention mechanism, and after average-pooling and max-pooling for concat fusion to form H×W×2 feature map $f_c$, and then processed by 3×3×1 convolution layer and Sigmoid function to obtain spatial attention map The spatial attention graph $f_u$, which is calculated as shown below:

$$f_u = \sigma(c(f_c))$$

Where, $f_u$ is the spatial attention map, $f_c$ is the H×W×2 feature map, c denotes the Sigmoid function, c is a 3×3×1 convolutional network, connect $f_u$ to the input feature map F to obtain the spatial dimensional feature map F" weighted by spatial attention.

Preferably, a relative position encoding algorithm is proposed in said step S1, which uses dot product to calculate the correlation fraction $e_{ij}$ between the input elements, which is calculated as shown below:

$$e_{ij} = \sqrt{\frac{\sigma}{d_z}\left[\left|P_i W^Q (P_j W^K)^T\right|^2 + \left|(P_i W^Q)\rho^T\right|^2\right]}$$

Where, $e_{ij}$ is the correlation score between the input elements, $\sigma$ is a trainable parameter with an initial value of 1, $\rho \in \mathbb{R}^{d_z}$ is a two-dimensional relative position weights, and interacts with query parameters in the transformer network; $W^Q$, $W^K$ are trainable parameter matrices; $P_i$, $P_j$ are graphs Inputs to the image block, i and j are the input image block numbers, $d_z$ denote the output matrix dimensions;

Incorporating relative position coding into Transformer networks to build a fused relative position coding Transformer module, enhancing boundary semantic information between occluded and occluded objects by reassigning pixel weights through inter-pixel distances to improve the accuracy of segmented boundaries of occluded dynamic objects.

Preferably, in step S2, robot in real-time operation, with known camera calibration parameters and feature point depths, associates static point m in space is associated from the reference frame $F_{k-1}$ to the latter frame $F_k$, which is calculated as:

$$m_k = \Delta[H_c \Delta^{-1} I_{k-1}(m_{k-1}, d_{k-1})]$$

Where, $\Delta$ and $\Delta^{-1}$ correspond to the projection function and the inverse projection function respectively, the function is composed of the camera's internal and external parameters, $H_c \in SE(3)$ is the relative transformation matrix of the camera pose, SE(3) is the Lie Group matrix; $I_{k-1}$ is the projection of a static point in space onto a 3D point in $F_{k-1}$, coordinates are $(m_{k-1}, d_{k-1})$ where $m_{k-1}$ is the 2D pixel coordinate of the point in frame $F_{k-1}$, $d_{k-1}$ is the depth of the point in the frame $F_{k-1}$; $m_k$ is the 2D pixel coordinates of a spatially static point projected into $F_k$;

The equation for the camera pose is shown below, and the camera pose is obtained by calculating the reprojection error, $$e(H_c) = m_k' - \Delta[I_{k-1}(m_{k-1}, d_{k-1}) \Delta H_c \exp(h_c)]$$

Where, $e(H_c)$ is the reprojection error of $H_c$, $H_c \in SE(3)$ is the relative transformation matrix of the camera position and pose, $h_c \in se(3)$ is the relative transformation vector of camera position and pose, obtained from the $H_c$ transformation; $I_{k-1}$ is the projection of object feature points onto 3D points in $F_{k-1}$, where $m_{k-1}$ is the point 2D pixel coordinates in frame $F_{k-1}$, $d_{k-1}$ is the depth of the point in frame $F_{k-1}$; $m_k'$ is the 2D pixel coordinate $m_{k-1}$ in the previous frame $F_{k-1}$ 2D pixel coordinates projected onto the current frame, $\Delta$ and $\Delta^{-1}$ correspond to the projection function and the inverse projection function respectively, exp(•) is the transformation from the Lie algebraic vector transformation to the Lie group matrix 3D transformation.

Preferably, in said step S3, Estimation of the object position and pose transformation matrix $H_c \in SE(3)$ from the camera motion, modelling of a potentially dynamic object as an entity with a position and pose transformation matrix $H_o$, associating dynamic points in space from reference frame $F_{k-1}$ to the next frame $F_k$, The calculation is The calculation is as follows:

$$\tilde{m}_k = \Delta[H_c H_o \Delta^{-1} I_{k-1}'(\tilde{m}_{k-1}, \tilde{d}_{z-1})]$$

Where, $H_c \in SE(3)$ is the camera motion estimated object position and pose transformation matrix, $H_o \in SE(3)$ is the relative transformation of the pose of the object matrix, $I_{k-1}'$ is the dynamic point m in space projected onto the 3D point in frame $F_{k-1}$, $\tilde{m}_{k-1}$ is the 2D pixel coordinate in depth image frame $F_{k-1}$, $d_{z-1}$ is the depth of the coordinate point in frame $F_{k-1}$, $\tilde{m}_k$ is the 2D point coordinate of the point $\tilde{m}$ frame $F_k$, $\Delta$ and $\Delta^{-1}$ correspond to the projection functions and the inverse projection function, The function is composed of camera internal and camera external parameters;

The object posture transformation matrix $H_o$ is obtained by reprojection error and least squares calculation, the formula is shown below:

$$e(H_o) = \tilde{m}_k' - \Delta[H_c H_o \Delta^{-1} I_{k-1}'(\tilde{m}_{k-1}, \tilde{d}_{z-1})]$$

Where, $e(H_o)$ is the reprojection error, $h_o \in se(3)$ is the vector of relative transformations of the object's pose, obtained from the $H_o$ transformation, $n_b$ is the relative the number of 3D points to be projected to 2D points for the corresponding residual operation, $\tilde{m}_k'$ is the 2D pixel coordinate $\tilde{m}_{k-1}$ of the previous frame $F_{k-1}$ projected onto the 2D pixel coordinate of the current frame, exp(•) is the three-dimensional transformation from the Lie Algebraic vector transform to the Lie Group matrix; The method derives the object transformation matrix by minimising the error value.

Preferably, in said step S4, a two-dimensional image measurement is used to determine the state of the object, assume that the feature point $\tilde{m}_{k-1}$ is a static projection point, then the pixel distance d between this projection point and its true projection point $\tilde{m}_k$ is the dynamic visual error, the median $\overline{L}$ of the dynamic visual error d of the pixel points on the potential dynamic object of the image is calculated and expressed as the dynamic visual error of the object; $\overline{L}$ is calculated as shown below:

$$\overline{L} = med\{d\} = med\{\|\tilde{m}_{k-1}', \tilde{m}_k\|\}$$

In the nonlinear pose optimization phase, the uncertainty error is set to satisfy a K-dimensional Gaussian distribution, and its differential entropy is calculated in the following manner as shown below:

$$G(x_0) = \log_2 w \sqrt{\Pi^{-1} \Sigma_r (\Pi^{-1})^T (2\pi e)^\mu}$$

Where, $G(x_0)$ is the differential entropy, $x_0$ is the input quantity, w is the probability of movement obtained from the propagation of the previous frame, $\Pi \in \mathbb{R}^{r \times 6}$ is the derivative of the residual equation, $\Sigma_r \in \mathbb{R}^{r \times r}$ is the covariance matrix, $r \in \mathbb{R}^r$ is the photometric reprojection error, $\mu$ denotes the K Gaussian distribution dimension; Based on this the object dynamic deviation is compared to a dynamic threshold $\Delta d = H(G(x))$ guided by differential entropy and slowly increasing with entropy, $H(G(x))$ is the function constructed for this purpose, If $\overline{L} > \Delta d$ determines that the object is a dynamic object.

Preferably, in said step S5, starts with the keyframe $F_t$ to be repaired, the keyframe images are aligned with the keyframe images to be repaired in order according to the grid flow between the two frames, and when all keyframe images are aligned with the keyframe images to be repaired, the keyframe images to be repaired are The missing area of the keyframe image to be repaired is indexed forward to the corresponding pixel, if one corresponding pixel is indexed forward, the missing area pixel is directly If more than one corresponding pixel value is indexed, the missing area pixel is averaged over the pixels indexed and then the missing area pixel is filled in.

The invention also provides a computer readable storage medium on which a computer program is stored, said computer program when executed by a processor implementing the steps of a deep learning based robot target recognition and motion detection method as described above.

The invention also provides a computer device comprising a memory, a processor and a computer program stored in the memory and runnable on the processor, said processor executing said computer program implementing the steps of a deep learning based robot target recognition and motion detection method as described above.

The present invention has the following advantages:

1. This method proposes a realistic approach that combines multiple attention mechanisms with relative location coding example segmentation network APNET. The network consists of a backbone network module to extract local features from the image, a multi-attention module to increase the pixel weight of the occluded object, and a fused relative position coding module to extract global features and improve the semantic information of the boundaries. Transformer module. The backbone network module adds a feature pyramid network FPN to ResNet-101 to build a residual-feature pyramid network, while to more effectively fuse different types of features from the backbone network, feature maps with richer boundary information are input to the fused relative position coding Transformer module, and feature maps with richer high-dimensional feature information are input to the multi-attention module. The multi-attention module uses a multiple-attention mechanism combining channel and space to enhance the pixel weighting of the obscured part of the object and improve the recognition rate of the obscured object. Incorporating relative position coding into the Transformer The network builds a fused relative position coding Transformer module that reassigns pixel weights by inter-pixel distance to enhance the boundary semantic information between the occluded and The transformer module can be used to enhance the boundary semantic information between the occluded object and the occluded object by redistributing the pixel weights through the inter-pixel distance.

2. The use of an instance segmentation network in the segmentation of potential dynamic objects only captures potential dynamic objects in the image, but lacks validity in determining whether the potential dynamic objects are moving or not. There is a lack of validity in determining whether the potential dynamic object is moving or not. To address this problem this method introduces potential dynamic object motion The three-step determination method estimates the camera pose by segmenting the static feature points outside the mask by example. Due to the coupling between the camera pose and the object pose The object motion transformation matrix is obtained from the camera pose transformation due to the coupling between the projection of the camera pose and the object pose in the same image. Dynamic The object contains more feature points, solve for the median dynamic parallax of the object on the potentially dynamic object, and find the positional attitude during the motion Optimisation stage differential entropy, derive dynamic objects based on the relationship between dynamic parallax and differential entropy. Remove dynamic region feature points to reduce the the influence of dynamic objects on the system.

3. When dynamic objects are removed from the traditional dynamic SLAM method, the feature information for pose estimation is reduced, which makes the pose estimation less accurate in scenes with more dynamic objects. dynamic SLAM methods are less accurate in scenes with many dynamic objects, which in turn affects loopback detection and complete full This in turn affects loopback detection and the construction of a full static scene map. Therefore, this method proposes a background restoration method based on the grid flow model, which completes the restoration of the static background of the RGB image and depth map of the current frame after the dynamic region rejection with the help of the static information of the previous frame, and introduces information entropy and cross-entropy to filter the high-quality feature points of the restored region.

DETAILED DESCRIPTION

The following is a further detailed description of the specific embodiments of the invention by means of a description of the embodiments against the accompanying drawings, in order to help those skilled in the art to have a more complete, accurate and reaching understanding of the inventive concept and technical solutions of the invention.

The traditional SLAM algorithm has difficulty in marking the occluded objects in dynamic occlusion scenes, cannot accurately determine the motion state of potential objects and has a low number of feature points after eliminating dynamic objects, which ultimately leads to poor localization and map construction in SLAM systems. The method consists of potential dynamic object segmentation, potential dynamic object motion determination, background restoration and feature extraction. The dynamic object segmentation segment is performed by the proposed instance segmentation The network performs instance segmentation of potential dynamic objects in the image information and extracts image feature points. In the segment of potential dynamic object motion determination, dynamic objects are obtained and dynamic points are eliminated by the three-step method of determining potential dynamic object motion. In the background restoration and feature extraction session, background restoration is performed on the rejected dynamic object areas using the previous image frame information, and feature points are extracted from the restored areas to provide more reliable information for SLAM system localisation and composition.

Example 1

As shown in FIGS. 1-5, the present invention provides deep learning based robot target recognition and motion detection method, comprising the following steps.

Figure 1:
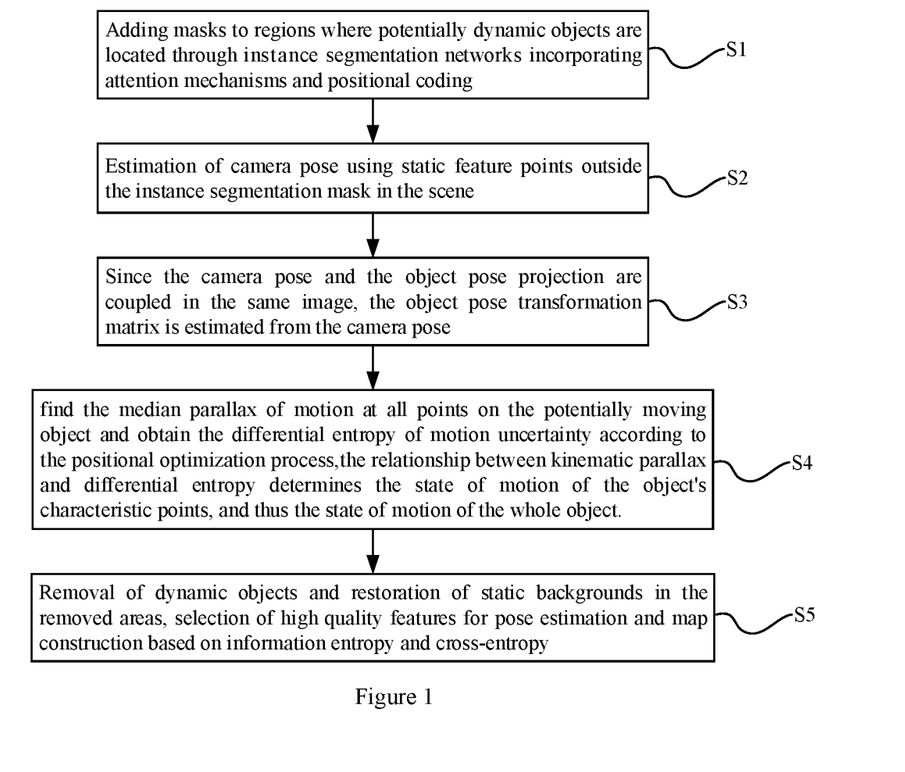
FIG. 1 shows a schematic diagram of the flow of the deep learning-based robot target recognition and motion detection method of the present invention.
Figure 2:
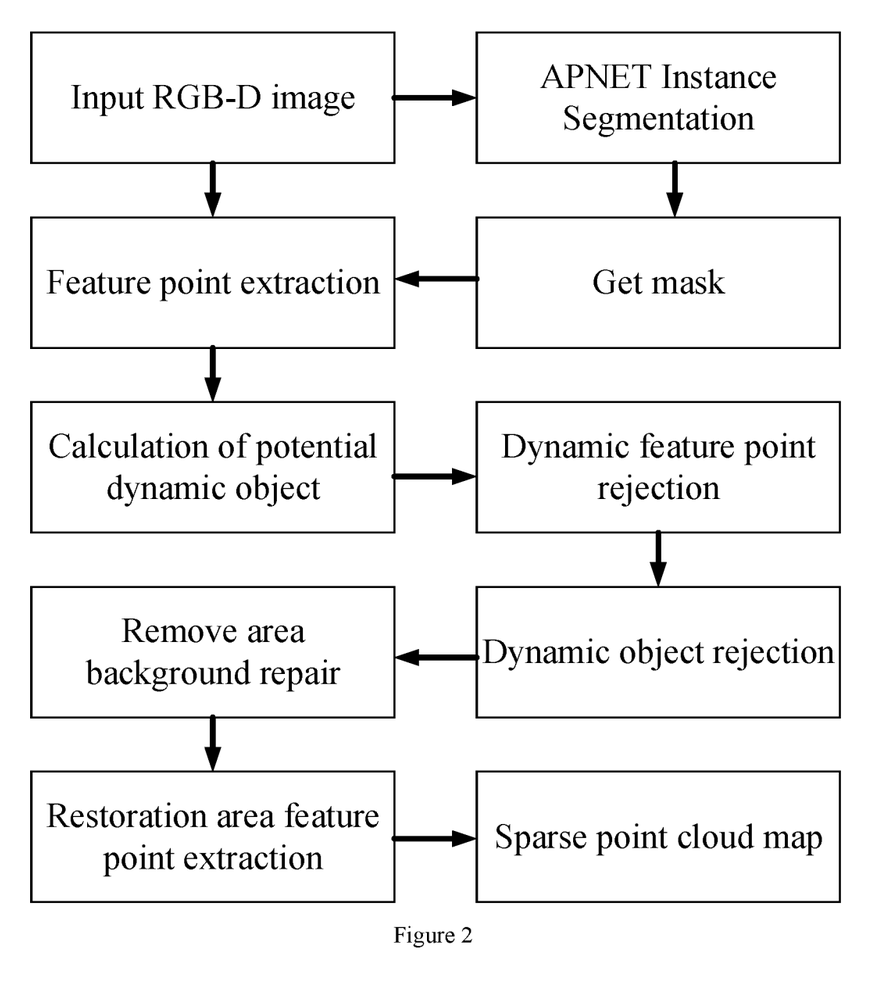
FIG. 2 shows a flow chart of the deep learning based robot target recognition and motion detection method of the present invention.
Figure 3:
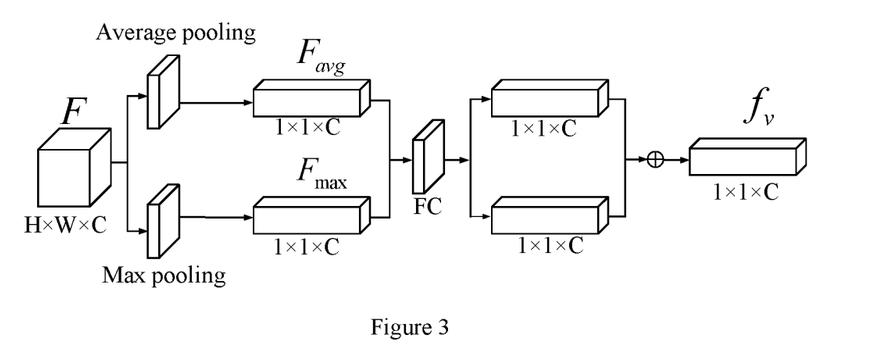
FIG. 3 shows the structure of the segmentation network of the example designed by the present invention.

Step S1, A mask is added to the region where the potential dynamic object is located by means of an instance segmentation network fusing attention mechanisms and location encoding.

Visual SLAM systems operate with large areas of the environment occupied by obscured objects, and failure to accurately identify potentially dynamic objects within them will interfere with the stability of the SLAM system. The multi-attention module designed by this method consists of two sub-networks, the channel attention mechanism and the spatial attention mechanism. The input feature map F is concatenated in the channel dimension and spatial dimension respectively, and the corresponding acquired channel dimension feature map F' is concatenated with the spatial dimension feature map F" to obtain the output F'". The multi-attention module uses a combination of channel and spatial attention mechanisms to generate a more discriminative feature representation. The module not only increases the channel weights of features in the region of interest, but also obtains the spatial location of the region of interest, fully highlighting the effective feature information in the occluded The module not only increases the feature channel weight of the region of interest, but also obtains the spatial location of the region of interest, fully highlighting the effective feature information of the occluded region while avoiding the influence of interference information.

The channel attention mechanism acts to assign the corresponding weights to each layer of channels in the feature map. This method inputs the input feature map F with H×W×C (height, width, number of channels) into the channel attention mechanism, and performs global attention averaging pooling and maximum pooling operations on the feature map to obtain information about each channel of the feature map. The global attention average pooling and maximum pooling operations are performed on the feature map to obtain the information of each channel of the feature map. The features $F_{avg}$ and $F_{max}$ obtained through average pooling and maximum pooling are subjected to the fully connected layer FC module to strengthen the correlation between channels and to reallocate the weights of each channel for better learning of occlusion features. The output $f_v$ obtained after the channel attention mechanism is calculated as shown below.

$$f_v = \sigma((F_{avg}+F_{max})\eta\beta)$$

Where, $\sigma$ denotes the Sigmoid function, $\eta$ denotes the ReLU function, $\beta$ is the parameter of the fully connected layer, and finally the channel-by-channel weighting of the input feature map F with $f_v$ to obtain the channel dimensional feature map F'.

The main function of the spatial attention mechanism used in this method is to increase the weight of the pixel values at the occluded locations in the feature map. After learning, the individual weights are continuously adjusted to direct the network's attention to the area where the occluded part is located. The input feature map F is fed into the spatial attention mechanism and is concat fused to form the H×W×2 feature map $f_c$ by averaging pooling and max pooling, and then processed by a 3×3×1 convolution layer and Sigmoid function to obtain the spatial attention map $f_u$, which is calculated(as shown below.

$$f_u = \sigma(c(f_c))$$

Where, $f_u$ is the spatial attention map, $f_c$ is the H×W×2 feature map, $\sigma$ denotes the Sigmoid function, c is 3×3×1 convolutional network, The spatial dimensional feature map F", weighted by spatial attention, is obtained by connecting $f_u$ to the input feature map F.

Figure 4:
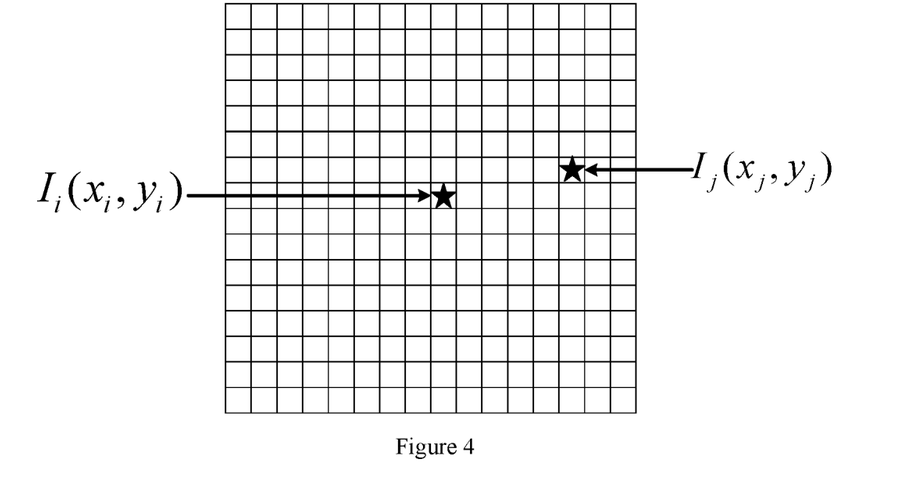
FIG. 4 shows a visualisation of the relative position of the pixels in the present invention.

A visualisation of the relative position of the pixels is shown in FIG. 4. The position encoding is done as follows: the image is split into 16*16 non-crossed image blocks with the same colours corresponding to positions sharing the same encoding. This method uses the D4 tessellation method to calculate the relative distance between pixels The distance between any two pixel coordinates $I_i(x_i,y_i)$, $I_j(x_j,y_j)$ is $D4(I_i, I_j)=|x_i-x_j|+|y_i-y_j|$. To reduce the computational effort of location coding, this method corresponds the relative distance between pixels to integers in a finite set, and then uses the integers to index the relative location weights $r_{ij}$, sharing the weights between different relative locations. This method maps a segmented index function from a real number field to a finite integer field and is calculated as shown below:

$$g(x) = \begin{cases} |x| & , |x| \leq \alpha \\ \text{sign}(x) \cdot \min\left(\beta, \left[\alpha + \frac{\ln(|x|/\alpha)}{\ln(\gamma/\alpha)}(\beta-\alpha)\right]\right) & , |x| > \alpha \end{cases}$$

where g(x) is the segment index function, sign($\cdot$) is the sign function, $\alpha$ determines the segmentation point, $\beta$ indicates the control output value range to control the output value to $[-\beta,\beta]$, and $\gamma$ is used to adjust the curvature of the logarithmic part. The number of computed parameters is greatly reduced by the segmented indexing function, which allocates more learnable parameters at relatively short distances.

The core of the Transformer is a self-attentive mechanism that models the relationship between input column order, however, the self-attentive mechanism cannot label the order of the input elements, so the introduction of positional encoding is particularly important for the Transformer. Currently the Transformer has difficulty characterising the correlation between input elements in the image domain, and is unable to accurately distinguish between the boundaries of occluded and occluded objects. This method proposes a relative position encoding algorithm which uses dot product to calculate the correlation fraction $e_{ij}$ between the input elements, which is calculated as shown below:

$$e_{ij} = \sqrt{\frac{\sigma}{d_Z}\left[\left|P_iW^Q(P_jW^K)^T\right|^2 + \left|(P_iW^Q)\rho^T\right|^2\right]}$$

Where, $e_{ij}$ is the correlation score between the input elements, $\sigma$ is a trainable parameter with an initial value of 1, $\rho \in \mathbb{R}^{d_z}$ is a two-dimensional relative position weights, and interacts with query parameters in the transformer network; $W^Q$, $W^K$ are trainable parameter matrices; $P_i$, $P_j$ are graphs Inputs to the image block, I and j are the input image block numbers, corresponding to the aforementioned pixels $I_i$, $I_j$, $d_z$ denote the output matrix dimensions.

The softmax function is used to calculate the weight coefficients $a_{ij}$, which are shown below.

$$a_{ij} = \frac{\exp(e_{ij})}{\sum_{k=1}^{n}\exp(e_{ik})}$$

k=1, 2, 3 . . . n in $e_{ik}$, n is the number of input image blocks. After a linear transformation, each output is weighted and calculated as shown below.

$$z_i = \sum_{j=1}^{n} a_{ij}(x_j W^V + r_{ij}^V)$$

Where, $z_i$ is the output weighted sum of the corresponding pixel $I_i$, $r_{ij}^V \in \mathbb{R}^{d_z}$ is the relative position weight and $W^v$ is the trainable parameter matrix.

The Multi-Attention module uses a multiple attention mechanism combining channel and space to enhance the pixel weights of the occluded part of the object and improve the recognition rate of the occluded object. The channel attention mechanism works by assigning the appropriate weight to each layer of channels in the feature map. Spatial attention is used to increase the weight of the pixel values at the occluded locations in the feature map, which is learned and adjusted to direct the network's attention to the area of the occluded part, thus adding a mask to the area of the potential dynamic object. By incorporating relative position coding into the Transformer network, a fused relative position coding Transformer module is constructed to enhance the boundary semantic information between the occluded and occluded objects by redistributing the pixel weights through inter-pixel distances, thus improving the accuracy of the segmented boundary of the occluded dynamic objects. Incorporating relative position coding into the Transformer network to build a fused relative position coding Transformer module that reassigns pixel weights by inter-pixel distance to enhance the boundary semantic information between the occluded and occluded objects and improve the accuracy of segmented boundaries of occluded dynamic objects.

Figure 5:
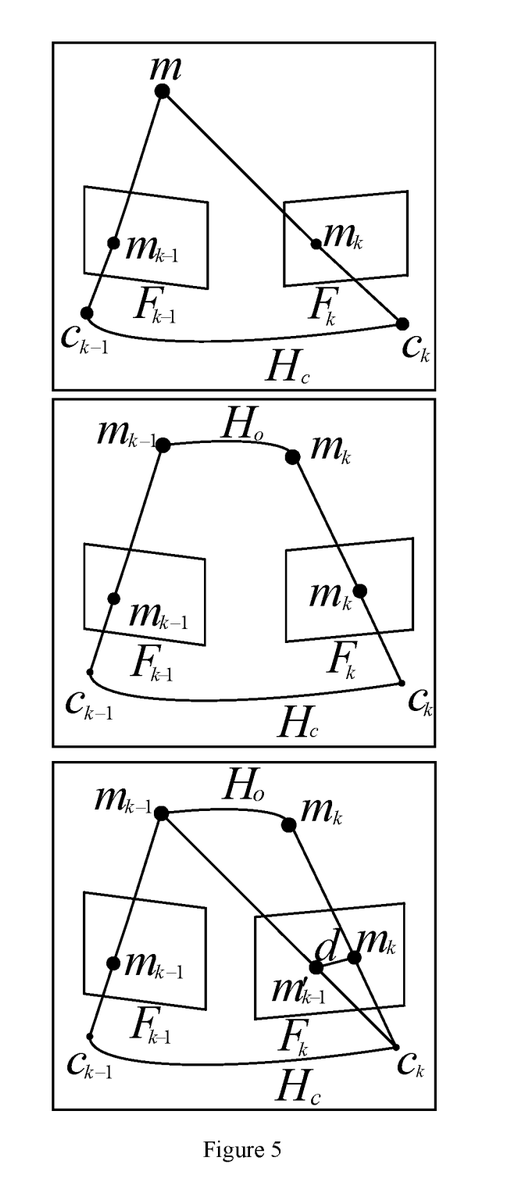
FIG. 5 shows a schematic diagram of the three-step method for determining the motion of potentially dynamic objects proposed by the present invention.

In step S2, the camera pose is estimated using static feature points outside the instance segmentation mask in the scene.

During real-time operation of the robot, static points m in space are associated from the reference frame $F_{k-1}$ to the latter frame $F_k$, provided that the camera calibration parameters and the depth of the feature points are known, which is calculated as follows.

$$m_k = \Delta[H_c \Delta^{-1} I_{k-1}(m_{k-1}, d_{k-1})]$$

Where, $\Delta$ and $\Delta^{-1}$ correspond to the projection function and the inverse projection function respectively, the function is composed of the camera's internal and external parameters, $H_c \in SE(3)$ is the relative transformation matrix of the camera pose, SE(3) is the Lie algebra matrix; $I_{k-1}$ is a projection of a static point in space to a 3D point in $F_{k-1}$, coordinates are $(m_{k-1}, d_{k-1})$, where $m_{k-1}$ is the 2D pixel coordinate of the point in frame $F_{k-1}$, $d_{k-1}$ is the depth of the point in the frame $F_{k-1}$; $m_k$ is the 2D pixel coordinates of a spatially static point projected into $F_k$.

The equation for the camera pose is shown below, and the camera pose is obtained by calculating the reprojection error, $$e(H_c) = m_k' - \Delta[I_{k-1}(m_{k-1}, d_{k-1})\Delta H_c \exp(h_c)]$$

Where, $e(H_c)$ is the reprojection error of $H_c$, $H_c \in SE(3)$ is the relative transformation matrix of the camera pose, $h_c \in se(3)$ is the phase machine attitude relative transformation vector, obtained from the $H_c$ transformation; $I_{k-1}$ is the projection of object feature points onto 3D points in $F_{k-1}$, where $m_{k-1}$ is the point 2D pixel coordinates in frame $F_{k-1}$, $d_{k-1}$ is the depth of the point in frame $F_{k-1}$; $m_k'$ is the 2D pixel coordinate $m_{k-1}$ in the previous frame $F_{k-1}$ 2D pixel coordinates projected onto the current frame, $\Delta$ and $\Delta^{-1}$ correspond to the projection function and the inverse projection function respectively, $\exp(\cdot)$ is the transformation from the Lie algebraic vector transformation to the Lie group matrix 3D transformation.

Define $\tilde{h}_c \in \mathbb{R}^6$ as a symbolic operation that maps from se(3) to $\mathbb{R}^6$, The least squares solution $\tilde{h}_c^*$ is shown below, $$\tilde{h}_c^* = \underset{h_c}{\operatorname{argmin}} \sum_i^n \rho_h \left( e(h_c)^T \sum_p^{-1} e(h_c) \right)$$

Where, $\rho_h$ is the penalty factor, $\Sigma_p$ is the covariance matrix of the reprojection error, n is the projection of the 3D points required for the residual operation into 2D Number of points, $e(h_c)$ is the reprojection error of $h_c$, the relative transformation matrix $H_c$ of the camera pose can be obtained by solving for the $h_c$ transformation, by The camera pose is obtained by optimizing the solution.

Step S3, Estimation of the object pose transformation matrix $H_c \in SE(3)$ from the camera motion, Modelling potentially dynamic objects as a solid with a positional transformation matrix $H_o$, associating dynamic points in space from reference frame $F_{k-1}$ to the next frame $F_k$, The calculation is The calculation is as follows:

$$\tilde{m}_k = \Delta[H_c H_o \Delta^{-1} I_{k-1}'(\tilde{m}_{k-1}, \tilde{d}_{z-1})]$$

Where, $H_c \in SE(3)$ is the camera motion estimated object pose transformation matrix, $H_o \in SE(3)$ is the relative transformation of the pose of the object matrix, $I_{k-1}'$ is the dynamic point tit in space projected onto the 3D point in frame $F_{k-1}$, $\tilde{m}_{k-1}$ is the 2D pixel coordinate in depth image frame $F_{k-1}$, $\tilde{d}_{z-1}$ is the depth of the coordinate point in frame $F_{k-1}$, $\tilde{m}_k$ is the 2D point coordinate of the point $\tilde{m}$ in frame $F_k$, $\Delta$ and $\Delta^{-1}$ correspond to the projection functions and the inverse projection function, The function is composed of camera internal and camera external parameters.

Similarly, the object posture transformation matrix Ho is obtained by reprojection error and least squares calculation, which is shown in the following equation.

$$\begin{cases} e(H_o) = \tilde{m}_k' - \Delta[H_c H_o \Delta^{-1} I_{k-1}'(\tilde{m}_{k-1}, \tilde{d}_{z-1})] \\ \tilde{h}_o^e = \underset{h_c}{\operatorname{argmin}} \sum_i^{n_c} \rho_h \left( e(h_0)^T \sum_p^{-1} e(h_o) \right) \end{cases}$$

Where, $e(H_o)$ is the reprojection error, $h_o \in se(3)$ is the vector of relative transformations of the object's pose, obtained from the $H_o$ transformation, $\tilde{m}_k'$ is the 2D pixel coordinate $\tilde{m}_{k-1}$ of the previous frame $F_{k-1}$ projected onto the 2D pixel coordinate of the current frame, $\exp(\cdot)$ is the transformation from the Lie algebraic vector to the Lie group matrix 3D transformation, $\tilde{h}_o^*$ denotes the corresponding least squares solution, $\rho_h$ is the penalty factor, $\Sigma_p$ is the covariance matrix of the reprojection error, $n_b$ is the number of 3D points to be projected to 2D points for the corresponding residual operation, $e(h_o)$ is the reprojection error of $h_o$.

In step S4, the median motion parallax of all points on the potentially moving object is found, and according to the positional optimization process, the The differential entropy of motion uncertainty is determined from the relationship between the motion parallax and the differential entropy to determine the motion state of the characteristic points of the object, and thus the motion state of the whole object. The relationship between the kinematic parallax and the differential entropy is used to determine the kinematic state of the characteristic points of the object, and thus the kinematic state of the whole object.

Due to the influence of noise in the feature tracking process, it is difficult to determine whether an object is moving by using only the object motion transformation matrix $H_o$ is moving or not. This method uses two-dimensional image measurement to determine the object state, assuming that the feature point $\tilde{m}_{k-1}$ is a static projection point, the pixel distance d between this projection point and its true projection point $\tilde{m}_k$ is the dynamic visual error, and the median $\overline{L}$ of the dynamic visual error d of the pixel points on the potential dynamic object of the image is calculated and expressed as the dynamic visual error of the object. $\overline{L}$ is calculated as shown below:

$$\overline{L} = med\{d\} = med\{\|\tilde{m}_{k-1}', \tilde{m}_k\|\}$$

In the nonlinear pose optimization phase, the uncertainty error is set to satisfy a K-dimensional Gaussian distribution, and its differential entropy is calculated in the following manner as shown below:

$$G(x_0) = \log_2 w \sqrt{|\Pi^{-1}\Sigma_r(\Pi^{-1})^T(2\pi e)^{\mu}|}$$

Where, $G(x_0)$ is the differential entropy, $x_0$ is the input quantity, w is the probability of movement obtained from the propagation of the previous frame, $\Pi \in \mathbb{R}^{n \times 6}$ is the derivative of the residual equation $\Sigma_r \in \mathbb{R}^{n \times n}$ is the covariance matrix, $re \in \mathbb{R}^n$ is the photometric reprojection error, $\mu$ denotes the K Gaussian distribution dimension; Based on this the object dynamic deviation is compared to a dynamic threshold $\Delta d = H(G(x))$ guided by differential entropy and slowly increasing with entropy, $H(G(x))$ is the function constructed for this purpose, If $\overline{L} > \Delta d$ determines that the object is a dynamic object.

Step S5, reject the dynamic objects therein and repair the static background of the rejected area, based on information entropy and cross-entropy The high quality feature points are filtered out for positional estimation and map construction.

Figure 8:
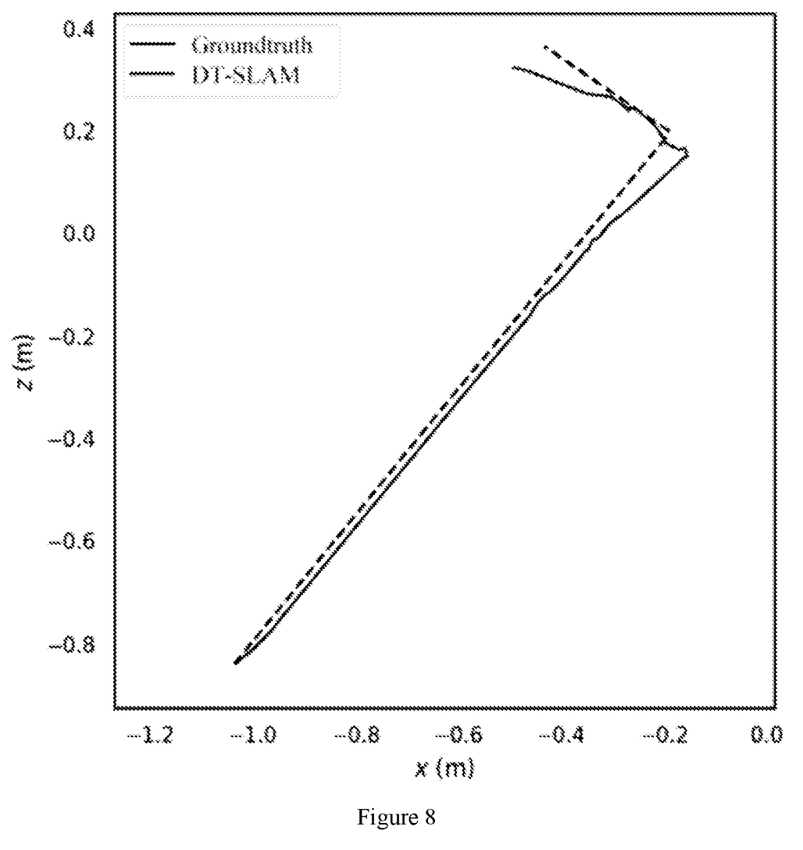
FIG. 8 shows the trajectory of the mobile robot running in real scenarios.

As shown in FIG. 8, this method starts with the keyframe to be repaired, $F_r$, and moves a 15-frame time in the direction of the arrow window. The keyframe images in the window are aligned with the keyframe image to be repaired according to the grid flow between the two frames in turn. When all the keyframe image is aligned with the frame image to be repaired, the missing area of the keyframe image to be repaired is indexed in the direction of the arrow towards The corresponding pixel is indexed forward. If one corresponding pixel is indexed forward, the missing area is filled in directly, if more than one corresponding pixel is indexed, the pixels are averaged. If more than one corresponding pixel value is indexed, the missing area is averaged over the pixels indexed and then the missing area is pixel-completed.

In order to avoid redundancy of feature points in the restoration area, this method divides the restoration area into N×N sub-regions, and uses information entropy to evaluate the information content of the image. information entropy to evaluate the information content of the image, determine the significant feature areas based on the information entropy value, and filter out the feature points extracted by the ORB algorithm from the The high quality feature points are selected from the feature points extracted by the ORB algorithm. This method sets $H_i$ as the local information entropy and $\overline{H}$ as the mean information entropy. If a local region satisfies $H_i > \overline{H}$ then it is a significant region. The calculation is shown below.

$$\begin{cases} H_i = -\sum_{i=0}^{n-1} p_i \log_2 p_i \\ \overline{H} = \frac{1}{N^2} \sum_{i=0}^{n-1} H_i \end{cases}$$

Where n is the number of grey levels and $P_i$ is the ratio of pixels with a grey value of i to the total number of pixel points.

In order to further filter the feature points, this method screens the feature points in the region by the size of the cross-entropy between two points and a set threshold. The smaller the cross-entropy, the higher the similarity, and if the cross-entropy of two points is less than the set threshold, the point is discarded. Cross-entropy The formula for D(g,h) is shown below.

$$D(g, h) = -\sum_{i,j=1}^{u} g(p, i) \log_2(h(p', j))$$

Where, u is the dimension of the descriptor, g(p,i) is the descriptor of the feature point p, Grayscale values are i, h(p', j) is the feature descriptor of the point p' with grayscale value j.

The process of the above deep learning-based robot target recognition and motion detection method is illustrated below in the context of specific experiments.

The scenes with occlusion in the dataset are selected to validate the effect of this method. The proposed method can accurately segment the occluded potential dynamic objects as it incorporates an attention mechanism to increase the feature representation of the occluded visible region, while adding the proposed positional encoding to the Transformer network to increase the semantic relevance of the occluded objects.

The region where the potential dynamic object is located is determined by instance segmentation, and the potential dynamic object motion state is determined according to the three-step method of potential dynamic object motion judgment and by using the combination of dynamic visual error and differential entropy in two-dimensional images to eliminate dynamic object feature points.

The traditional dynamic SLAM method does not reject enough static feature points of dynamic objects when there are few feature points. This method eliminates the static background of the dynamic object part by grid flow restoration, and adopts a combination of information entropy and cross-entropy to filter high quality feature points.

When combined with the SLAM method, the trajectory of this method is similar to the real trajectory due to the use of dynamic object judgement and rejection to reduce the effect of dynamic objects on the system and to fix the fully static map.

Figure 6:
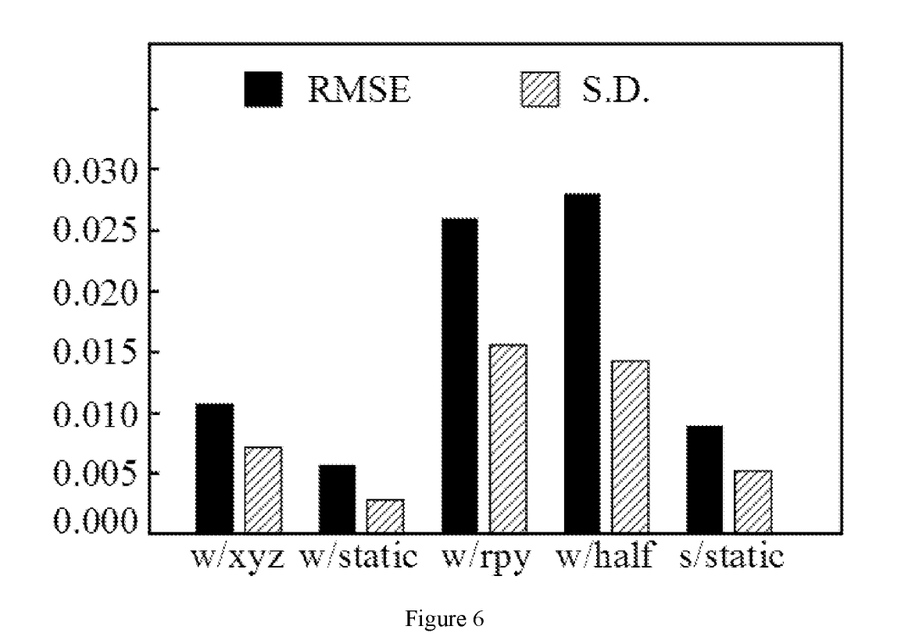
FIG. 6 shows a histogram of the absolute trajectory error assessment data obtained from the present invention run under the TUM dataset.
Figure 7:
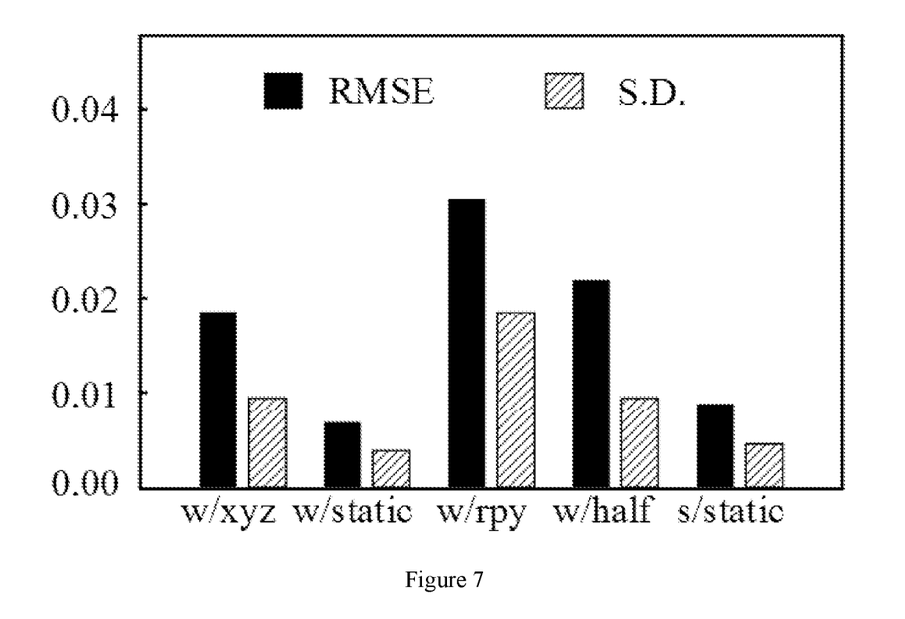
FIG. 7 shows a histogram of the relative translation error assessment data obtained from the present invention run under the TUM dataset.

FIGS. 6 to 7 show the absolute trajectory error and relative trajectory translation error histograms of the method for different sequences of the open dataset, with root mean square error (RMSE) and standard deviation (S.D.) as measures, with lower values representing a more stable SLAM system. It is clear from the graph that the method is still highly robust in dynamic occlusion environments.

The approach of this embodiment will be illustrated below with another set of experiments: The size of The real experimental environment is 12 m×5 m. The plan layout of the real scene includes the workbench, The experimental process involves the robot movement route and the pedestrian round trip movement route.

This experiment demonstrates the effect of this method on instance segmentation in a real scene. The characters in the collected image is heavily occluded by the workbench, and the method can effectively segment the occluded objects by enhancing the semantic between the pixel weights and the boundaries of the occluded regions.

The experiment verifies the performance of this method for dynamic object rejection in real scenes. The motion state of a moving person in the image can be accurately identified and its feature points can be rejected.

The effectiveness of the method is verified by the image frames acquired in the actual scene. The method reproduces the static background in the dynamic region partly by background restoration, which increases the accuracy of the system's bit pose estimation and composition.

FIG. 8 shows the trajectory of this method. As can be seen from FIG. 18, the method increases the number of feature points used for pose estimation and composition in a dynamic occlusion environment by adding the ATNET instance segmentation algorithm to detect potential dynamic objects in the scene and estimating the dynamic objects in it using the three-step determination method for potential moving objects, and removing the dynamic object areas by using the mesh flow model to repair and extract feature points. Therefore, this method has high robustness in dynamic occlusion environment.

Example 2

Corresponding to Example I of the present invention, Example II of the present invention provides a computer readable storage medium on which a computer program is stored, the program being executed by a processor in accordance with the method of Example I to achieve the following steps.

In step S1, adding masks to regions where potentially dynamic objects are located through instance segmentation networks incorporating attention mechanisms and positional coding.

In step S2, the camera pose is estimated using static feature points outside the image segmentation mask.

In step S3, since the camera pose and the object pose projection are coupled in the same image, the object pose transformation matrix is calculated from the camera pose.

In step S4, the median motion parallax of all points on the potentially moving object is found, and the differential entropy of motion uncertainty is obtained according to the positional optimization process, and the motion state of the object's characteristic points is judged from the relationship between motion parallax and differential entropy, so that the motion state of the whole object can be judged.

In step S5, the dynamic objects are eliminated and the static background of the eliminated area is repaired, and the high quality feature points are filtered according to information entropy and cross-entropy for positional estimation and map construction.

The storage media mentioned above include: USB flash drives, mobile hard drives, Read-Only Memory (ROM), Random Access Memory (RAM), CD-ROM and various other media that can store program code.

The above specific limitations on the steps implemented after the execution of a program in a computer readable storage medium can be found in Example 1 and will not be described in detail here.

Example 3

Corresponding to Example I of the present invention, Example III of the present invention provides a computer device comprising a memory, a processor and a computer program stored in the memory and runnable on the processor, said processor executing said program in accordance with the method of Example I to achieve the following steps.

In step S1, adding masks to regions where potentially dynamic objects are located through instance segmentation networks incorporating attention mechanisms and positional coding.

In step S2, the camera pose is estimated using static feature points outside the image segmentation mask.

In step S3, since the camera pose and the object pose projection are coupled in the same image, the object pose transformation matrix is calculated from the camera pose.

In step S4, the median motion parallax of all points on the potentially moving object is found, and the differential entropy of motion uncertainty is obtained according to the positional optimization process, and the motion state of the object's characteristic points is judged from the relationship between motion parallax and differential entropy, so that the motion state of the whole object can be judged.

In step S5, the dynamic objects are eliminated and the static background of the eliminated area is repaired, and the high quality feature points are filtered according to information entropy and cross-entropy for positional estimation and map construction.

The above specific qualification of the steps for the implementation of the computer device can be found in Example 1 and will not be described in detail here.

It is to be noted that each box in the block diagram and/or flowchart, and the combination of boxes in the block diagram and/or flowchart, in the accompanying drawings of the specification of the present invention may be implemented with a dedicated hardware-based system performing the specified function or action, or may be implemented with a combination of dedicated hardware and acquired machine instructions.

The above exemplary description of the invention in conjunction with the accompanying drawings makes it clear that the specific implementation of the invention is not limited by the manner described above, and that various non-substantial improvements to the inventive concept and technical solution of the invention, or direct application of the inventive concept and technical solution to other contexts without improvements, are within the scope of protection of the invention.

The invention claimed is:

1. A deep learning based method for robot target recognition and motion detection, comprising the steps of:
adding masks to regions where potentially dynamic objects are located through instance segmentation networks incorporating attention mechanisms and positional coding;
estimating a camera pose using static feature points outside a instance segmentation mask in the scene;
estimating an object pose transformation matrix from the camera pose as the camera pose and an object pose projection are coupled in the same image;
finding a median motion parallax of all points on a potentially moving object, obtaining a differential entropy of motion uncertainty according to a positional optimization process, and determining a motion state of the object's characteristic points from the relationship between the median motion parallax and the differential entropy, so as to determine the motion state of a whole object;
eliminating the dynamic objects, repairing the static background of the eliminated area, and filtering high quality feature points according to information entropy and cross-entropy for positional estimation and map construction;

wherein in the step of adding the masks, a multi-attention module consists of two sub-networks, a channel attention mechanism and a spatial attention mechanism, which connect an input feature map F in a channel dimension and a spatial dimension respectively, and concatenate a corresponding acquired channel dimension feature map F' with a spatial dimension feature map F''' to obtain an output F''', in order to enhance a pixel weight of an obscured object part and improve a recognition rate of the obscured object, and channel attention mechanism works by assigning weights to each layer of channels in the feature map, while the spatial attention mechanism works by increasing a weight of pixel values at occluded locations in the feature map, continuously adjusting each weight value after learning, and then directing the network to focus on an area where an occluded part is located, thus adding a mask to the area where the potentially dynamic objects are located;

wherein in the step of adding the masks, the H×W×C feature map F is input to the channel attention mechanism, and the feature map is subjected to average pooling and maximum pooling operations to obtain information about each channel of the feature map, features $F_{avg}$ and $F_{max}$ obtained through average-pooling and max-pooling are subjected to a fully connected layer FC module to strengthen a correlation between channels and to reallocate the weights of each layer of the channels for better learning of occlusion features, an output $f_v$, obtained through the channel attention mechanism, is calculated as shown below:

$$f_v = \sigma((F_{avg} + F_{max})\eta\beta)$$

where, $\sigma$ denotes a Sigmoid function, $\eta$ denotes a ReLU function, $\beta$ is a parameter for a fully connected layer, finally, a channel dimensional feature map F' is obtained by layer-by-layer channel weighting of the input feature map F using $f_v$, with H, W and C denoting height, width and number of channels respectively;

wherein in the step of adding the masks, the input feature map F is also fed into the spatial attention mechanism, and after average-pooling and max-pooling for concat fusion to form H×W×2 feature map $f_c$, and then processed by 3×3×1 convolution layer and the Sigmoid function to obtain a spatial attention map $f_u$, which is calculated as shown below:

$$f_u = \sigma(c(f_c))$$

where, $f_u$ is the spatial attention map, $f_c$ is an H×W×2 feature map, $\sigma$ denotes the Sigmoid function, c is a 3×3×1 convolutional network, connect $f_u$ to the input feature map F to obtain the spatial dimensional feature map F'' weighted by spatial attention;

wherein a relative position encoding algorithm is proposed in said step the step of adding the masks, which uses dot product to calculate a correlation fraction $e_{ij}$ between input elements, which is calculated as shown below:

$$e_{ij} = \sqrt{\frac{\sigma}{d_z} \left[ \left| P_i W^Q (P_j W^K)^T \right|^2 + \left| (P_i W^Q) \rho^T \right|^2 \right]}$$

where, $e_{ij}$ is a correlation score between the input elements, $\sigma$ is a trainable parameter with an initial value of 1, $\rho \in \mathbb{R}^{d_z}$ is a two-dimensional relative position weights, and interacts with query parameters in a transformer network; $W^Q$, $W^K$ are trainable parameter matrices; $P_i$, $P_j$ are inputs to the image block, i and j are an input image block numbers, $d_z$ denote the output matrix dimensions; incorporating relative position coding into transformer networks to build a fused relative position coding transformer module, enhancing boundary semantic information between occluded and occluded objects by reassigning pixel weights through inter-pixel distances to improve accuracy of segmented boundaries of occluded dynamic objects, wherein in the step of estimating the camera pose, robot in real-time operation, with known camera calibration parameters and feature point depths, associates static point m in space is associated from a reference frame $F_{k-1}$ to a latter frame $F_k$, which is calculated as:

$$m_k = \Delta[H_c \Delta^{-1} I_{k-1}(m_{k-1}, d_{k-1})]$$

where, $\Delta$ and $\Delta^{-1}$ correspond to a projection function and an inverse projection function respectively, the function is composed of the camera's internal and external parameters, $H_c \in SE(3)$ is a relative transformation matrix of the camera pose, SE(3) is a Lie Group matrix; $I_{k-1}$ is a projection of a static point in space onto a 3D point in $F_{k-1}$, coordinates are $(m_{k-1}, d_{k-1})$, where $m_{k-1}$ is a 2D pixel coordinate of a point in frame $F_{k-1}$, $d_{k-1}$ is a depth of the point in the frame $F_{k-1}$; $m_k$ is the 2D pixel coordinates of a spatially static point projected into $F_k$;

wherein the camera pose is obtained by calculating the reprojection error as follows:

$$e(H_c) = m_k' - \Delta[I_{k-1}(m_{k-1}, d_{k-1})] \Delta H_c \exp(h_c)]$$

where, $e(H_c)$ is the reprojection error of $H_c$, $H_c \in SE(3)$ is the relative transformation matrix of the camera position and pose, $h_c \in se(3)$ is a relative transformation vector of camera position and pose, obtained from an $H_c$ transformation; $I_{k-1}$ is the projection of object feature points onto 3D points in $F_{k-1}$, where $m_{k-1}$ is the 2D pixel coordinates in frame $F_{k-1}$, $d_{k-1}$ is the depth of the point in frame $F_{k-1}$; $m_k'$ is the 2D pixel coordinate $m_{k-1}$ in the previous frame $F_{k-1}$ 2D pixel coordinates projected onto the current frame, $\Delta$ and $\Delta^{-1}$ correspond to the projection function and the inverse projection function respectively, exp(•) is a transformation from a Lie algebraic vector transformation to a Lie group matrix 3D transformation;

for defining $\tilde{h}_c \in \mathbb{R}^6$ as a symbolic operation that maps from se(3) to $\mathbb{R}^6$, a least squares solution $\tilde{h}_c^*$ is shown below, $$\tilde{h}_c^* = \underset{h_c}{\mathrm{argmin}} \sum_i^n \rho_h \left( e(h_c)^i \sum_p^{-1} e(h_c) \right)$$

where, $\rho_h$ is a penalty factor, $\Sigma_p$ is a covariance matrix of the reprojection error, n is the projection of the 3D points required for a residual operation into 2D number of points, $e(h_c)$ is the reprojection error of $h_c$, the relative transformation matrix $H_c$ of the camera pose is obtained by solving for the $h_c$ transformation, by the camera pose is obtained by optimizing the solution;

wherein in the step of estimating the object pose transformation matrix, estimation of the object position and pose transformation matrix $H_c \in SE(3)$ from a camera motion, modelling of a potentially dynamic object as an entity with a position and pose transformation matrix $H_o$, associating dynamic points in space from reference frame $F_{k-1}$ to the next frame $F_k$, the calculation is The calculation is as follows:

$$\tilde{m}_k = \Delta[H_c H_o \Delta^{-1} I_{k-1}'(\tilde{m}_{k-1}, \tilde{d}_{z-1})]$$

where, $H_c \in SE(3)$ is the camera motion estimated object position and pose transformation matrix, $H_o \in SE(3)$ is the relative transformation of the pose of the object matrix, $I_{k-1}'$ is a dynamic point $\tilde{m}$ in space projected onto the 3D point in frame $F_{k-1}$, $\tilde{m}_{k-1}$ is the 2D pixel coordinate in depth image frame $F_{k-1}$, $\tilde{d}_{z-1}$ is the depth of the coordinate point in frame $F_{k-1}$, $\tilde{m}_k$ is the 2D point coordinate of the point $\tilde{m}$ in the frame $F_k$, $\Delta$ and $\Delta^{-1}$ correspond to the projection function and the inverse projection function, the function is composed of camera internal and camera external parameters;

the object posture transformation matrix $H_o$ is obtained by reprojection error and least squares calculation as follows:

$$e(H_o) = \tilde{m}_k' - \Delta[H_c H_o \Delta^{-1} I_{k-1}'(\tilde{m}_{k-1}, \tilde{d}_{z-1})]$$

where, $e(H_o)$ is the reprojection error, $h_o \in se(3)$ is the vector of relative transformations of the object's pose, obtained from the $H_o$ transformation, $n_b$ is a relative number of 3D points to be projected to 2D points for a corresponding residual operation, $\tilde{m}_k'$ is the 2D pixel coordinate $\tilde{m}_{k-1}$ of the previous frame $F_{k-1}$ projected onto the 2D pixel coordinate of a current frame, $\exp(\cdot)$ is the transformation from the Lie algebraic vector transformation to the Lie group matrix; the method deriving the object transformation matrix by minimising an error value;

wherein in the step of finding the median motion parallax, a two-dimensional image measurement is used to determine a state of the object, assume that the feature point $\tilde{m}_{k-1}$ is a static projection point, then a pixel distance d between the static projection point and its true projection point, $\tilde{m}_k$ is a dynamic visual error, a median $\overline{L}$ of a dynamic visual error d of the pixel points on the potential dynamic object of the image is calculated and expressed as the dynamic visual error of the object; $\overline{L}$ as shown below:

$$\overline{L} = med\{d\} = med\{\|\tilde{m}_{k-1}', \tilde{m}_k\|\}$$

wherein in a nonlinear pose optimization phase, an uncertainty error is set to satisfy a K-dimensional Gaussian distribution, and its differential entropy is calculated as below:

$$G(x_0) = \log_2 w \sqrt{\Pi^{-1} \Sigma_r (\Pi^{-1})^T (2\pi e)^\mu}$$

where, $G(x_0)$ is the differential entropy, $x_0$ is an input quantity, w is a probability of movement obtained from a propagation of the previous frame, $\Pi \in \mathbb{R}^{n \times 6}$ is a derivative of a residual equation, $\Sigma_r \in \mathbb{R}^{n \times n}$ is a covariance matrix, $r \in \mathbb{R}^n$ is a photometric reprojection error, $\mu$ denotes a K Gaussian distribution dimension; based on an object dynamic deviation is compared to a dynamic threshold $\Delta d = H(G(x))$ guided by the differential entropy and slowly increasing with the differential entropy, $H(G(x))$ is the function constructed for this purpose, if $\overline{L} > \Delta d$ determines that the object is a dynamic object.

2. The deep learning based method for robot target recognition and motion detection according to claim 1, said step of eliminating the dynamic objects starts with a keyframe $F_t$ to be repaired, keyframe images are aligned with the keyframe images to be repaired in order according to a grid flow between the two frames, and when all keyframe images are aligned with the keyframe images to be repaired, the keyframe images to be repaired are a missing area of a keyframe image to be repaired is indexed forward to a corresponding pixel, if one corresponding pixel is indexed forward, a missing area pixel is directly if more than one corresponding pixel value is indexed, the missing area pixel is averaged over pixels indexed and then the missing area pixel is filled in.

3. A non-transitory computer readable storage medium having a computer program stored thereon, wherein said computer program when executed by a processor implements the steps of the deep learning based robot target recognition and motion detection method as claimed in claim 1.

4. A computer device comprising a memory, a processor and a computer program stored in the memory and runnable on the processor, wherein said processor implements the steps of a deep learning based robot target recognition and motion detection method as described in claim 1 when executing said computer program.

* * * * *